United States Patent
Takahashi et al.

(10) Patent No.: US 7,860,369 B2
(45) Date of Patent: Dec. 28, 2010

(54) PLAY-BACK DEVICE AND METHOD FOR CONTROLLING THE SAME

(75) Inventors: Masaru Takahashi, Yokohama (JP); Taku Nakamura, Yokohama (JP)

(73) Assignee: Hitachi, Ltd., Tokyo (JP)

(\*) Notice: Subject to any disclaimer, the term of this patent is extended or adjusted under 35 U.S.C. 154(b) by 1270 days.

(21) Appl. No.: 11/367,701

(22) Filed: Mar. 6, 2006

(65) Prior Publication Data

US 2006/0248439 A1 Nov. 2, 2006

(30) Foreign Application Priority Data

Apr. 28, 2005 (JP) ............................. 2005-130748

(51) Int. Cl.
*H04N 5/91* (2006.01)
*H04N 7/00* (2006.01)
(52) U.S. Cl. .......................................... 386/68; 386/46
(58) Field of Classification Search .................. 386/95, 386/46, 68, 69, 52; 725/40, 42
See application file for complete search history.

(56) References Cited

U.S. PATENT DOCUMENTS

2004/0128685 A1\* 7/2004 Hassell et al. ................. 725/40
2006/0093328 A1\* 5/2006 Nakagawa .................... 386/95

FOREIGN PATENT DOCUMENTS

| JP | 2000-78528 A | 3/2000 |
|---|---|---|
| JP | 2001-309300 A | 11/2001 |
| JP | 2002-247524 | \* 8/2002 |

\* cited by examiner

*Primary Examiner*—Robert Chevalier
(74) *Attorney, Agent, or Firm*—McDermott Will & Emery LLP

(57) ABSTRACT

A play-back device receiving data including program parts and specific parts, detecting duplicated part in which contents are repeated in the specific part included in the data and before and after the specific part. On playing back the data, when it comes to the specific part or the duplicated part it outputs an indication indicating that it is the specific part or the duplicated part on a display screen. When it receives a skip play-back or fast play-back instruction from a user, it controls to skip play back or fast play back the specific part or the duplicated part. It then becomes possible to provide a play-back device with enhanced usefulness for the user and a method for controlling the same.

15 Claims, 5 Drawing Sheets

PLAY-BACK DEVICE AND METHOD FOR CONTROLLING THE SAME

INCORPORATION BY REFERENCE

The present application claims priority from Japanese application JP2005-130748 filed on Apr. 28, 2005, the content of which is hereby incorporated by reference into this application.

FIELD OF THE INVENTION

The present invention relates to a play-back device which plays back data and to a method for controlling the same.

BACKGROUND OF THE INVENTION

On broadcasting TV programs, sometimes a method is taken to repeatedly broadcast the contents of the TV program itself immediately before a CM (Commercial Message) at the beginning of the TV program itself after the CM. In Japanese Patent Publication JP-A-2001-309300, it is described a broadcast record and play-back device which is capable of receiving program 1 in which normal program is recorded and program 2 in which timing information of a part in which the CM and the program are duplicated is recorded. In this device, for the viewer who made a contract or pays a TV license fee, the program 2 is enabled to be decoded and in the program 1 the part in which the CM and the program are duplicated is automatically cut.

SUMMARY OF THE INVENTION

In many cases the program in which the timing information of the part in which the CM and the program are duplicated is recorded can not be obtained, and the request of the user to view the program except the CM or the duplicated part of the program is not satisfied. Also, as the needs of the users are diversified, there are ones who want to view the program including the CM part and the duplicated part, and there are also users who want to view except the duplicated part only. Therefore, if specific parts are automatically deleted on the device side, it results to be the play-back against the user's will and it is possible that the device would rather be the one that is not useful.

The object of the present invention is to provide a play-back device with enhanced usefulness for the user and a method for controlling the same.

In order to solve the above problems, a play-back device according to the present invention receives data including program parts and specific parts, and detects duplicated part in which the contents are repeated in the specific part included in the data and before and after the specific part. And, on playing back the data, when it comes to the specific part or the duplicated part, it outputs an indication indicating that it is the specific part or the duplicated part on a display screen. When it receives a skip play-back or fast play-back instruction from the user, it controls to skip play back or fast play back the specific part or the duplicated part.

According to the present invention, it is possible to provide a play-back device with enhanced usefulness for the user and a method for controlling the same.

BRIEF DESCRIPTION OF THE DRAWINGS

FIG. 2 is a diagram explaining a configuration of data stream and a method for detecting specific part or the like.

DESCRIPTION OF THE EMBODIMENTS

Figure 1:
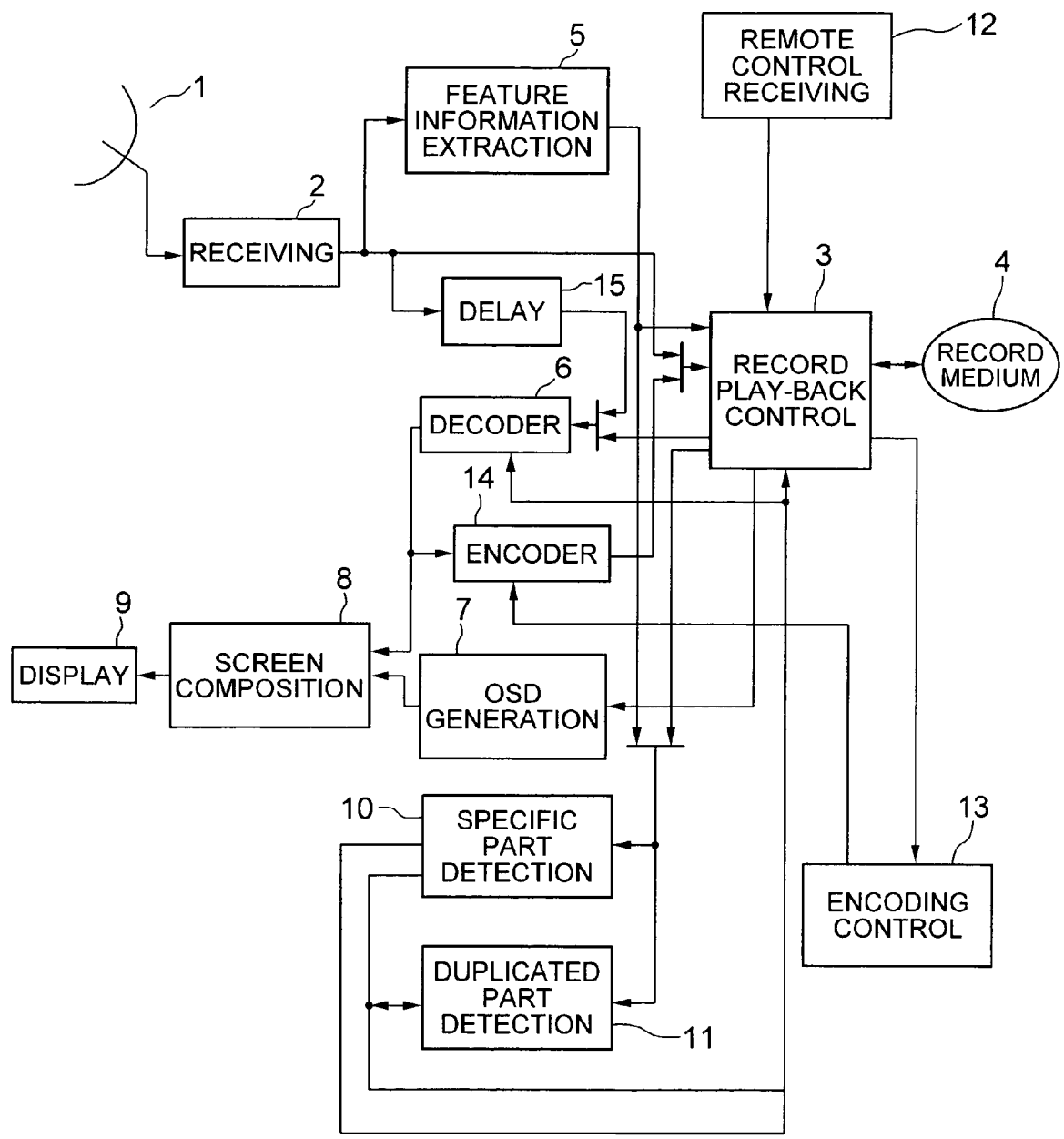
FIG. 1 is a block diagram showing an example of a configuration of a record and play-back device.

FIG. 1 is a block diagram showing an example of a configuration of a record and play-back device according to the present invention. First, a record operation of this record and play-back device will be explained. Signal is received by a receiving circuit 2 via an antenna 1. The received signal is data, such as for example, TV broadcast program, etc. And, the received signal is recorded in a record medium 4 such as a hard disk or DVD, through a record and play-back control circuit 3. The record and play-back control circuit 3 is provided with a record and play-back part and a control part, and the control part controls each component of the record and play-back device responding to a user instruction received by a remote control receiving part 12, and performs the record and play-back operation. Here, the control part may be provided separate from the record and play-back part.

Figure 2:
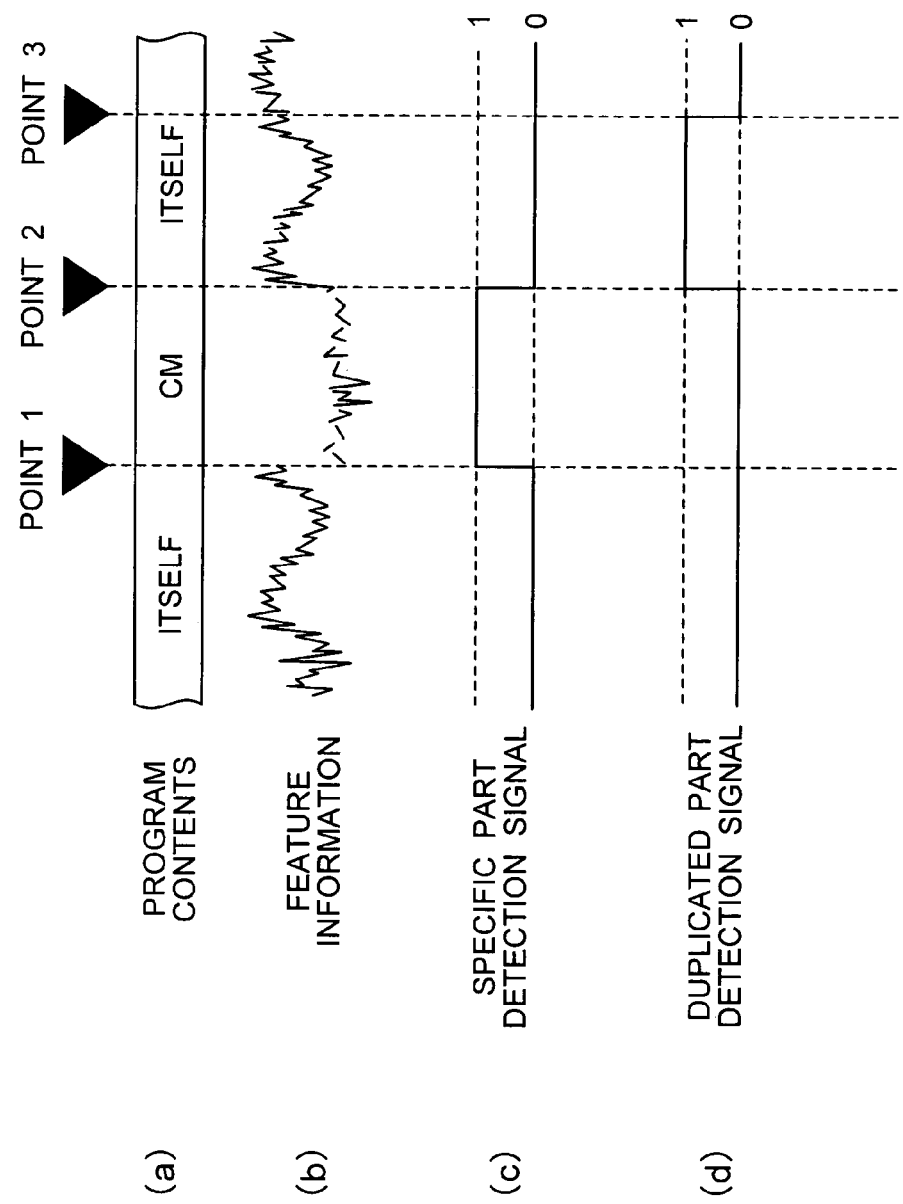

The received signal is, for example as shown in (a) part in FIG. 2, a data stream including program itself and CM (commercial message). Here, if OSD (On Screen Display) information such as subtitles is included in the received signal, it is recorded in the record medium 4 together with the data stream. This data stream is input to a feature information extraction circuit 5 and feature information of the received signal is extracted. The feature information is stream information, such as for example, transition of code amount per picture of received image, statistics of motion vector used for coarseness of quantization or motion compensation, etc. Also, as feature information, image information such as level of brightness and chromaticity or motion amount, etc. may be extracted and sound information such as volume or sound mode such as stereo or monaural, etc. may be extracted. A conceptual diagram of the extracted feature information is shown in (b) part in FIG. 2.

The feature information extracted at the feature information extraction circuit 5 is sent to a specific part detection circuit 10 and a duplicated part detection circuit 11. At the specific part detection circuit 10, it detects specific part such as CM using the feature information and outputs specific part information with 0 for non specific part and 1 for specific part, for example as shown in (c) part in FIG. 2. The specific part detection circuit 10, for example if the feature information changes more than given at point 1 shown in FIG. 2, regards the point 1 as the beginning part of the CM, and next if the feature information changes more than given at point 2, regards the point 2 as the end part of the CM. And, it detects part between the point 1 and the point 2 as the specific part. Or, when change points at which the feature information changes more than given occur at the certain time interval, it detects that part as the specific part.

The duplicated part detection circuit 11 detects the duplicated part of the program itself by searching the match of the feature information of before and after the CM detected at the specific part detection circuit 10. If there is duplicated part, it sends a detection signal, for example such as shown in (d) part in FIG. 2, to the play-back control circuit 3. In this embodiment, as it is judged whether the program is duplicated or not using the extracted feature information, for example compared to the method of comparing the entire frame, the processing load of the record and play-back device can be reduced.

As it has been described above, according to this embodiment, it can be judged whether there is duplicated part of the program itself before and after the CM part as well as the CM part.

The detected specific part information and duplicated information is recorded in the storage medium 4 in relation to the data stream. Thereby, when playing back the data stream, the specific part and the duplicated part can be easily identified.

Figure 3:
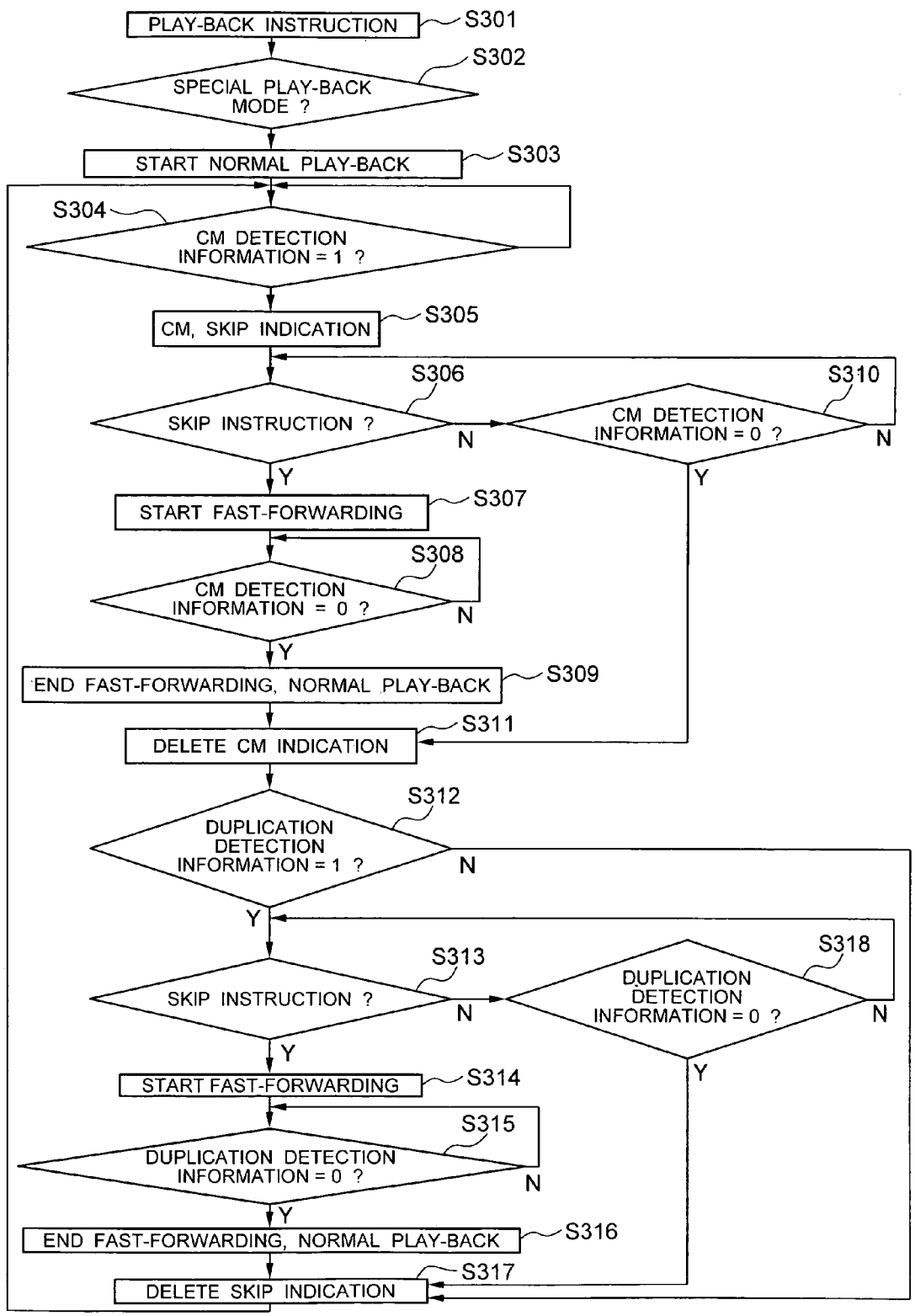
FIG. 3 is a flow chart showing an example of play-back operation in the record and play-back device.

Next, a play-back operation will be explained using FIG. 3. FIG. 3 is a flow chart showing an example of a play-back controlling operation.

When a play-back instruction and a data selection to request play-back are input from the user via the remote control receiving part 12 (S301), the process judges whether the play-back instruction received at the record and play-back control circuit 3 requests the execution of a special play-back mode or it requests the execution of a normal play-back mode (S302). Now, here, the normal play-back mode is a mode in which the entire data stream including the specific part such as CM, etc. is played back with normal play-back speed. On the other hand, the special play-back mode is a mode in which the play-back is done with the program itself played back with normal speed, and the specific part such as CM, etc. skipped or fast played back with the play-back speed faster than the normal play-back. Here, the explanation about the controlling method for the normal play-back mode will be omitted. By this switching, reflecting the user's will, it can respond to the needs of the viewer who wants to view the program including the CM part and the duplicated part.

Figure 4A:
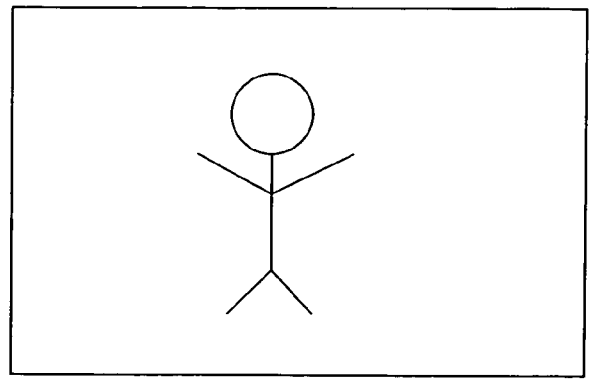
FIG. 4A is an example of a display screen in a special play-back mode.

When the execution of the special play-back mode is requested, first, the normal play-back is started (S303). More specifically, the data stream of the selected data and the specific part information corresponding to this data stream are read out from the record medium 4. The read out data stream is input to a decoder 6, sound data and image data are restored and output to a display device 9. FIG. 4A shows an example of a display screen of the display device 9. Here, in the example shown in FIG. 1 the display device is built in the record and play-back device, but it is not restricted to this example but the display device may be used connected by radio or wire as an external device.

Figure 4B:
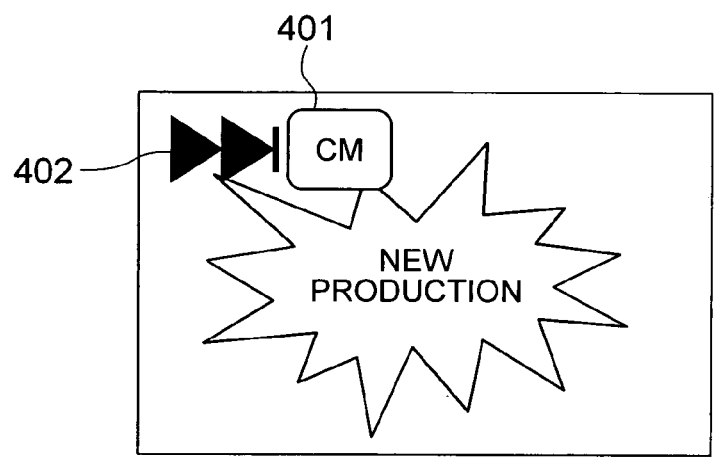
FIG. 4B is an example of a display screen in a special play-back mode.

If the process detects the beginning of the CM based on the specific part information read out from the record medium 4 (S304), a CM mark 401 (a CM icon) indicating that it is playing back the CM and image data regarding a skip button indicating that the fast-forwarding is possible are created by an OSD generation circuit 7, and image data duplicating the CM icon and the skip button 402 is displayed on the display device by an image composition circuit 8 (S305). FIG. 4B shows an example of the display screen when the display device 9 is showing the CM.

When a skip (fast-forwarding) instruction is input from the user via the remote control receiving part 12 (S306), the process starts the fast-forwarding (S307). In this way, by displaying the CM mark the user can easily conform that it entered in the CM. Also, as the process starts the fast-forwarding responding to the skip instruction from the user, the data can be prevented from being fast-forwarded against the user's will.

When the process detects the end of the CM (S308), it terminates the fast-forwarding and starts the normal play-back (S309). At S308 or S310 if the end of the CM is detected the process deletes the CM mark display (S311).

After the end of the CM, if the beginning of the duplicated part of the program is detected based on the duplicated part information (S312), the process keeps the skip indication displayed on the screen display. Here, instead of the skip indication, an icon which indicates that it is the duplicated part, etc. may be displayed, or the skip indication is kept still and any duplication mark replacing the CM mark 401 may be displayed side by side.

When a skip instruction from the user is received (S313), the process starts the fast-forwarding (S314). Thereby the user can easily fast-forward the duplicated program part. Also, there is a case in which the user hopes to view again even it is the duplicated part, by starting the fast-forwarding responding to the skip instruction from the user as in this embodiment, the fast-forwarding against the user's will can be prevented.

When the end of the duplicated part of the program itself that follows the CM part is detected (S315), the process terminates the fast-forwarding and starts the normal play-back (S316), and it deletes the skip button on the screen (S317). When the duplicated part is not detected at S312 and when the end of the duplicated part is detected without the skip instruction at S318 the process deletes the skip button display (S317) in the same way as well. Here, it is omitted the representation in this flow chart, but when the selected data stream is through to the end and when a play-back stop instruction from the user is input the play-back process is terminated.

Here, instead of the skip play-back which plays back the data skipping the specific part it may perform the fast play-back which plays back the data with the speed faster than the normal play-back. In case the fast play-back is performed like this, as the user can confirm the screen being fast-forwarded, even when the position of the end of the CM or the position of the end of the duplicated part is detected by error, the user can know that the part which he or she wants to view has come, and the user can handle the situation by inputting the normal play-back instruction, etc.

As it has been described above, according to this embodiment, by detecting the CM part and the duplicated part before and after the CM, the skip play-back or the fast play-back of the redundant part has become possible. Also, without automatically deleting or fast-forwarding the CM part, etc. the device displays it by the icon and requests the viewer to input the instruction. Therefore, the user can select any play-back mode according to the usage form, and also can prevent the device from automatically skipping, etc. even if there is a detection error.

Here, it is preferable to allow the user to select the automatic skip beforehand. Depends on the user it happens that the user feels it troublesome to do the skip instruction, so by allowing the user to select the control according to the usage form of the user, the usefulness can be enhanced.

Here, in this embodiment, by detecting the position of the CM or the duplicated part when recording the data, and recording the detected information in the record medium 4, it is not necessary to perform the position detection before the play-back and the processing load on playing back can be reduced. However, it is not restricted to this and the CM part, etc. may be detected by the specific part detection circuit while playing back using a delay circuit 15.

Next, a method for performing transcode at the record and play-back device will be explained. The transcode is to record the data stream received by the receiving circuit 2 in the record medium 4, to compress the data stream read out from the record medium 4 by bit rate conversion or format conversion more than when it was received at encoder 14 and record it.

Figure 5:
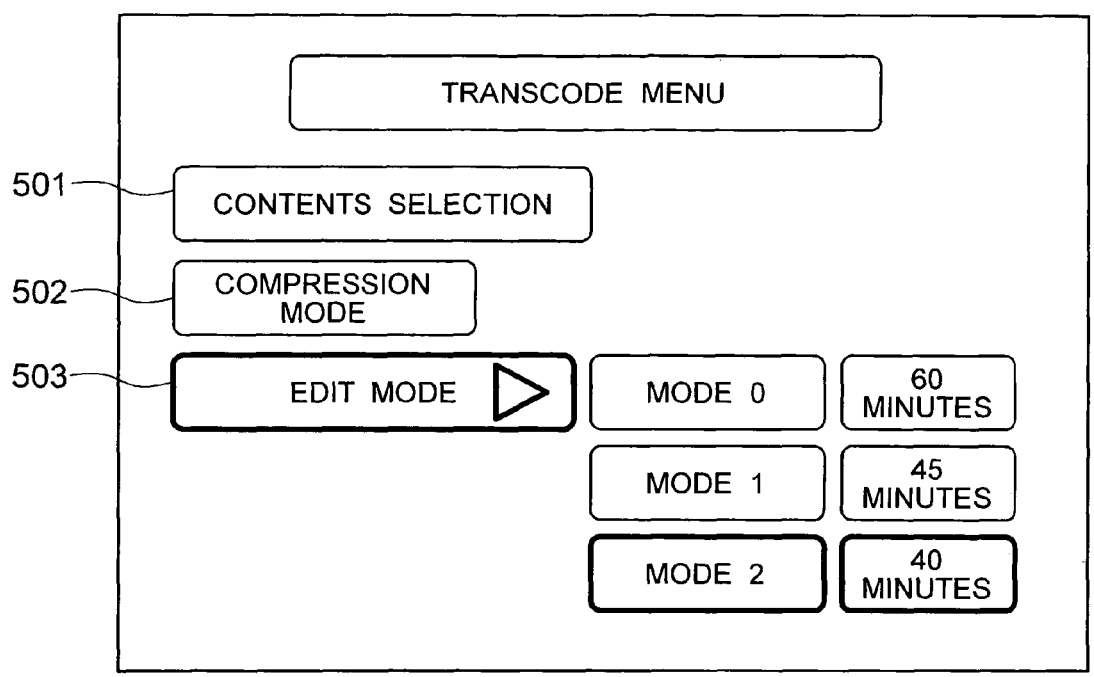
FIG. 5 is an example of a display screen of a transcode menu.

In this embodiment, there are three kinds of transcode mode, namely, mode 0 to compress the entire received data stream, mode 1 to compress the data except the CM part, and mode 2 to compress the data except the CM part and the duplicated part. The device allows the user to select the mode by displaying a transcode menu screen such as shown in FIG. 5. In this embodiment, in the transcode menu screen, by selecting a "transcode selection" or contents selection button 501 the user can select the contents to transcode and by selecting a "compression mode" button 502 the user can select the compression rate. When the compression rate is selected, the compression rate by the encoder 14 is changed via the encoding control circuit 13. In the example of FIG. 5 the case in which a "edit mode" button 503 is selected and the mode 2 which is shown in thick frame is selected is shown.

Here, in this example, together with the mode the play-back time which the transcode takes in the corresponding mode is displayed side by side. Thereby the user can know how long the play-back time can be reduced by the transcode and take it as a reference when selecting the mode. Here, this time is changed by the contents or the compression rate which are selected. Also, the information to display is not restricted to the play-back time and the time necessary to transcode or the data amount after the transcode may be shown.

Figure 4C:
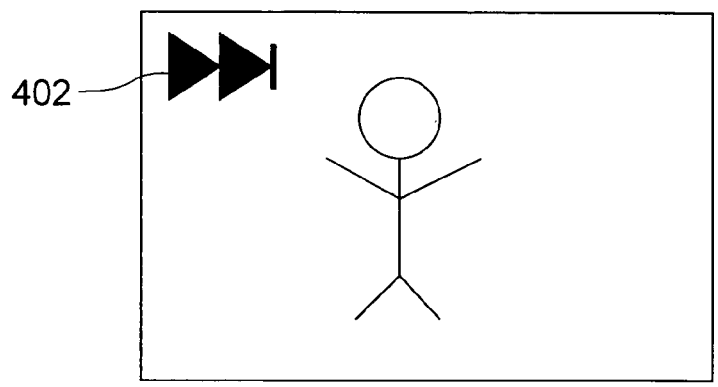
FIG. 4C is an example of a display screen in a special play-back mode.

Here, the selection of the part to be deleted when transcoding may be done while the user is playing back the data stream. In this case, when it comes to the CM part or the duplicated part while playing back, the device displays the indication such as shown in FIG. 4B or FIG. 4C, and when the skip instruction is input from the user the CM part or the duplicated part is skipped while playing back and the data stream except the corresponding part is compressed. By controlling in this way the user can determine the part to be deleted when transcoding after confirming the part to be deleted one by one.

As it has been described above, according to this embodiment, by detecting the CM part and the duplicated parts before and after the CM, the editing can be done by simple operation and the recording capacity can be saved. Also, by displaying the icon and allowing the viewer to judge, even when there is a detection error it can be prevented to delete the necessary part. Here, it has been explained the example to delete the CM part or the duplicated part, but it is not restricted to this example. For example, instead of deleting the CM part, etc., it may be controlled to encode it with reduced code amount. Also, as to the duplicated part, the predictive coding may be performed using a part with the same contents shown before the CM as prediction image. In this case, as the prediction error is extremely small the efficiency of the encoding compression is enhanced and the code amount can be reduced without image deterioration.

As it has been described above, according to this embodiment, by detecting the CM part and the duplicated parts before and after the CM and by controlling the encoding, the recording capacity can be saved.

Next, a method for performing direct transcode will be explained. The direct transcode is to record the received stream after compressing it at the encoder 14 without once recording it in the record medium 4. The feature information is directly sent from the feature information extraction circuit 5 to the specific part detection circuit 10 and the duplicated part detection circuit 11. The stream is sent to the decoder delayed by the time needed to extract the feature by the delay circuit 15. As to the deletion of the CM part and the redundant parts before and after it, it is the same as the transcode. Also, in case the code amount of the CM part, etc. is reduced in stead of deleting it, it is also the same as the transcode.

As it has been described above, according to this embodiment, by detecting the CM part and the duplicated parts before and after the CM, the editing can be done by simple operation and the recording capacity can be saved. Also, by detecting the CM part and the duplicated parts before and after the CM and by controlling the encoding, the recording capacity can be saved. Moreover, by recording the received stream after directly transcoding it without once recording it, the recording capacity can be saved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A play-back device connectable to a display device, comprising:
    a receiving part which receives data including program parts and specific parts;
    a specific part detection part which detects a specific part from the received data;
    a duplication detection part which detects a duplicated part subsequent to the specific part, the duplicated part repeating contents in a program part proceeding the specific part;
    an output part which outputs screen display information which indicates what is being displayed on the display device is the specific part or the duplicated part in playing back the data when the specific part or the duplicated part is detected; and
    a control part which controls to skip play back or fast play back the specific part or the duplicated part when the screen display information is displayed on the display device and a skip play-back or fast play-back instruction from a user is received.

2. A play-back device according to claim 1, further comprising a memory part which stores information relating to a position of the specific part detected by the specific part detection part, information relating to a position of the duplicated part detected by the duplicated part, and the data received by the receiving part.

3. A play-back device according to claim 1, further comprising a encoder which encodes the data to reduce a code amount of the specific part or the duplicated part, and a memory part which stores the data encoded by the encoder.

4. A play-back device according to claim 1, wherein the specific parts are commercial messages.

5. A controlling method, comprising the steps of:
    receiving data including program parts and specific parts;
    detecting a duplicated part subsequent to a specific part, the duplicated part repeating contents in a program part proceeding the specific part;
    outputting a first indication indicating what is being displayed on a display screen is the specific part or the duplicated part in playing back the data when the specific part or the duplicated part is detected;
    judging whether or not a skip play-back or fast play-back instruction from a user is received;

performing a skip play back or a fast play back on the specific part or the duplicated part when the skip play-back or fast play-back instruction from a user is received; and displaying a second indication showing that skipping play back or fast play back operation is being performed.

6. A method for controlling according to claim 5, further comprising the step of controlling to store information relating to positions of the detected specific part and duplicated part in relation to the received data in a record medium.

7. A method for controlling according to claim 5, further comprising the step of controlling to encode the data to reduce a code amount of the specific part or the duplicated part, and to store the encoded data in a record medium.

8. A method for controlling according to claim 5, wherein the specific parts are commercial messages.

9. A play-back device according to claim 2, wherein the specific parts are commercial messages.

10. A play-back device according to claim 3, wherein the specific parts are commercial messages.

11. A method for controlling according to claim 6, wherein the specific parts are commercial messages.

12. A method for controlling according to claim 7, wherein the specific parts are commercial messages.

13. A play-back device comprising:

a first receiving part which receives data including program parts and specific parts of a TV broadcast;

a second receiving part which receives a skip play-back signal from a user;

a display part which displays the data received by the first receiving part;

a specific part detection part which detects a specific part from the data received by the first receiving part; and a controlling part which controls the display part to display an indication indicating what is being displayed is the specific part in playing back the data when the specific part detected by the specific part detection part is played back, and controls the display part to perform skip a play-back on the specific part when the skip play-back signal is received by the second receiving part while displaying the indication.

14. The method according to claim 5, further comprising the step of compressing a portion of the received data, and displaying time information necessary for playing-back the compressed data.

15. The method according to claim 14, wherein the compressing step compresses the portion of the data entirely, the portion of the data except a commercial message, or the portion of the data except the commercial message and the duplicated part.

* * * * *